(12) United States Patent
Bi et al.

(10) Patent No.: US 12,143,954 B2
(45) Date of Patent: Nov. 12, 2024

(54) METHOD AND DEVICE FOR DETERMINING REFERENCE TIMING, STORAGE MEDIUM, AND ELECTRONIC APPARATUS

(71) Applicant: ZTE Corporation, Shenzhen (CN)

(72) Inventors: Feng Bi, Shenzhen (CN); Weimin Xing, Shenzhen (CN); Wenfeng Zhang, Shenzhen (CN); Youxiong Lu, Shenzhen (CN); Wenhao Liu, Shenzhen (CN); Ting Miao, Shenzhen (CN); Meng Mei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/288,218

(22) PCT Filed: Oct. 17, 2019

(86) PCT No.: PCT/CN2019/111724
§ 371 (c)(1),
(2) Date: Apr. 23, 2021

(87) PCT Pub. No.: WO2020/083092
PCT Pub. Date: Apr. 30, 2020

(65) Prior Publication Data
US 2021/0400609 A1  Dec. 23, 2021

(30) Foreign Application Priority Data
Oct. 25, 2018 (CN) .......................... 201811253154.6

(51) Int. Cl.
*H04W 56/00* (2009.01)

(52) U.S. Cl.
CPC ....... *H04W 56/004* (2013.01); *H04W 56/007* (2013.01); *H04W 56/009* (2013.01)

(58) Field of Classification Search
CPC ........... H04W 56/0015; H04W 56/004; H04W 56/007; H04W 56/009; H04W 56/00
See application file for complete search history.

(56) References Cited

U.S. PATENT DOCUMENTS

| 5,828,660 A | 10/1998 | Baum |
| 7,272,376 B1 * | 9/2007 | Sparr ................ H04W 36/0083 370/335 |

(Continued)

FOREIGN PATENT DOCUMENTS

| CN | 101431795 A | 5/2009 |
| CN | 101447861 A | 6/2009 |

(Continued)

OTHER PUBLICATIONS

International Search Report for corresponding application PCT/CN2019/111724 filed Oct. 17, 2019; Mail date Jan. 15, 2020.

(Continued)

*Primary Examiner* — Stephen J Clawson
(74) *Attorney, Agent, or Firm* — CANTOR COLBURN LLP

(57) ABSTRACT

Provided are a method and device for determining a reference timing, a storage medium and an electronic device. The method comprises: a second node determining a reference timing of the second node by using at least one of the following modes: an open-loop mode, a closed-loop mode and an external synchronization source mode. By means of the present disclosure, the problem in the related art that there is no technical solution for setting a reference timing between each-hop links yet exists is solved.

7 Claims, 1 Drawing Sheet a second node determines a reference timing of the second node using at least one of the following modes: an open-loop mode, a closed-loop mode and an external synchronization source mode  ⟶ S202

(56) References Cited

U.S. PATENT DOCUMENTS

| | | | |
|---|---|---|---|
| 8,867,513 B2 | 10/2014 | Park | |
| 2013/0142177 A1* | 6/2013 | Nentwig | H04W 56/0085 370/336 |
| 2013/0163534 A1* | 6/2013 | Anderson | H04W 72/0446 370/329 |
| 2015/0319718 A1* | 11/2015 | Yang | H04W 76/15 370/252 |
| 2021/0058884 A1* | 2/2021 | Liu | H04W 56/00 |
| 2022/0078740 A1* | 3/2022 | Harada | H04W 56/0045 |

FOREIGN PATENT DOCUMENTS

| | | | |
|---|---|---|---|
| CN | 101517944 A | 8/2009 | |
| CN | 103905136 A | 7/2014 | |
| CN | 105282840 A | 1/2016 | |
| CN | 106452645 A | 2/2017 | |
| CN | 106455042 A | 2/2017 | |
| CN | 107046461 A | 8/2017 | |
| EP | 2187688 A2 | 5/2010 | |
| EP | 2640138 A1 | 9/2013 | |
| KR | 20010078643 A | 8/2001 | |
| KR | 1020150134847 A | 12/2015 | |
| WO | 2010018445 A2 | 2/2010 | |
| WO | 2017204702 A1 | 11/2017 | |

OTHER PUBLICATIONS

Ericsson, IP.Access, CMCC, "Propagation delays in Radio Interface Based Synchronisation", 3GPP TSG-RAN WG3 Meeting #87bis R3-150788 Tenerife, Spain, Apr. 20-24, 2015.

European Search Report for corresponding application EP19875554; Report dated Jan. 3, 2022.

Huawei, HiSilicon, "Sidelink Synchronization enhancement in V2V communication", 3GPP TSG RAN WG1 Meeting #85 R1-164105 Nanjing, China May 23-27, 2016, R1-164105.

Wu Chen, A clock Synchronization Method for Ad Hoc Networks Based on Mean Field,, Chinese Journal of Computers, vol. 39, No. 5. May 2016.

ZTE Technology Journal, "High-Speed PAM4 Clock and Data Recovery Techniques for 5G Communications", 1994-2023.

* cited by examiner a second node determines a reference timing of the second node using at least one of the following modes: an open-loop mode, a closed-loop mode and an external synchronization source mode — S202

METHOD AND DEVICE FOR DETERMINING REFERENCE TIMING, STORAGE MEDIUM, AND ELECTRONIC APPARATUS

CROSS-REFERENCE TO RELATED APPLICATIONS

The present disclosure claims priority to Chinese Patent Application No. 201811253154.6, filed to the China Patent Office on Oct. 25, 2018, the disclosure of which is hereby incorporated by reference in its entirety.

TECHNICAL FIELD

The present disclosure relates to the field of communications, and in particular, to a method and device for determining reference timing, a storage medium, and an electronic device.

BACKGROUND

With the continuous improvement of radio technologies, a large number of radio services emerge. However, spectrum resources that the radio services rely on are limited. When faced with the continuous increase of people's requirements on bandwidth, spectrum resources between 300 MHZ and 3 GHZ, which are mainly used in conventional commercial communications, are extremely compact, and cannot meet the requirements of future radio communications. In a new generation of wireless communication system (for example, in an NR (New Radio) system (or referred to as 5G system), a new generation wireless communication system after 5G is also included), a carrier frequency higher than a carrier frequency adopted by the 4th Generation Mobile Communication (4G) system will be adopted to communicate, for example, 28 GHZ, 45 GHz, 70 GHz, etc. The high frequency channel has disadvantages such as a large free propagation loss, easily absorbed by oxygen, being affected by rain attenuation, and severely affects the coverage performance of the high frequency communication system. However, since a carrier frequency corresponding to high-frequency communication has a shorter wavelength, it can be ensured that more antenna elements can be accommodated in a unit area, and the more antenna elements mean that a beamforming method can be used to improve antenna gain, thereby ensuring coverage performance of high-frequency communication.

A dense cell is an increasingly important disclosure scenario, and the dense cell needs more network deployment costs, so that a network can be easily deployed by introducing wireless backhaul transmission, and the network deployment costs are greatly reduced. In addition, an NR system includes a high frequency band, so that physical characteristics of a high frequency carrier are determined, coverage of the high frequency carrier is a very big challenge, and wireless backhaul transmission can also solve this problem. Based on the above requirements, in the NR system, an integral access and backhaul link (IAB) has been established.

For ease of description, several labels ($L_{P,DL}$, $L_{P,UL}$), ($L_{C,DL}$, $L_{C,UL}$), ($L_{A,DL}$, $L_{A,UL}$) are defined in the current standard, where ($L_{P,DL}$, $L_{P,UL}$) represent a downlink and an uplink between a node and a parent node, the link may be a Backhaul link (BL), and the node may be a child node of the parent node; ($L_{C,DL}$, $L_{C,UL}$) represents a downlink and an uplink between a node and a child node, the link may serve as a BL, and the node may serve as a parent node of the child node; ($L_{A,DL}$, $L_{A,UL}$) represents a downlink and an uplink between a node and a user equipment. The link may be an Access link (AL for short), and a parent node is also referred to as a Donor Node (DN for short). At present, two stages are also defined for a relay node RN (also referred to as an IAB Node) in the standard, that is, stage_1 represents that the relay node synchronizes with a user equipment (or a mobile terminal) identity and initially accesses a network after being powered, that is, a user equipment mode; stage_2 represents that the relay node, after completing synchronization and initial access to the network, communicates with other nodes or user equipments in a node (or a centralized unit or a distributed unit) identity, that is, a node mode.

On the other hand, in the wireless communication system, because the distance between each user equipment and the base station is different, it needs to ensure that the data transmitted by each user equipment arrives at the base station side at the same time, and the base station notifies the user equipment of how much time needs to be transmitted in advance through a Timing Advance Command (TAC for short). After receiving the TAC in RAR (Random Access Response) or TAC in MAC CE (MAC Control Elements), the user equipment transmits in advance at a corresponding time point. Notably, for a communication with transmission and repeat conversion on the same frequency resource, the TA value calculated according to the configured TAC may include a transmission and repeat conversion time TA_offset, that is, the final calculated TA value is equal to the TA value in the configured TAC plus TA_offset, where TA_offset is greater than or equal to zero. However, after a Relay Node (RN for short) is introduced into a communication system, a timing problem between links for each hop is solved. For a node, after a reference timing moment is set, other timing relationships are set based on the reference timing. However, at present, there is no technical solution for setting reference timing between each hops of a link in the relevant art.

Aiming at the described problems in the related art, there is no effective solution at present.

SUMMARY

Embodiments of the present disclosure provide a method and device for determining reference timing, a storage medium, and an electronic device, so as to at least solve the problem in the related art that there is no technical solution for setting a reference timing between each hops of a link.

According to an embodiment of the present disclosure, provided is a method for determining a reference timing, and the method may includes: a second node determines a reference timing of the second node by using at least one of the following modes: an open-loop mode, a closed-loop mode, and an external synchronization source mode.

According to another embodiment of the present disclosure, provided is a method for determining reference timing, and the method may includes: a first node indicates mode signaling to a second node through wireless air interface signaling; wherein the mode indicated by the mode signaling is at least one of an open-loop mode, a closed-loop mode and an external synchronization source mode; the mode indicated by the mode signaling is used to determine a reference timing of the second node.

According to still another embodiment of the present disclosure, provided is a device for determining a reference timing, and the device is applied to a second node side, and the device may includes: a first determination module, configured to determine a reference timing of the second node by using at least one of the following modes: an open-loop mode, a closed-loop mode, and an external synchronization source mode.

According to another embodiment of the present disclosure, provided is a device for determining a reference timing, which is applied to a first node side. The device may includes: a second determination module, configured to determine a reference timing of a second node based on wireless air interface signaling by means of at least one of the following: updating signaling to a transmission delay table indicated by the second node via wireless air interface signaling; an offset Offset_1 indicated to the second node through wireless air interface signaling, wherein Offset_1 represents an offset between uplink reception timing and downlink transmission timing of the first node; an offset Offset_2 indicated to the second node through wireless air interface signaling, where Offset_2 represents an offset between an uplink reception timing and a downlink transmission timing of the first node; enabling signaling indicated to the second node via wireless air interface signaling, wherein the enabling signaling instructs the second node to determine that the second node is in a node mode; update signaling indicated to the second node through wireless air interface signaling, wherein the update signaling instructs the second node to take a reference timing as a reference offset; mode signaling indicated to the second node via wireless air interface signaling, wherein the mode indicated by the mode signaling is at least one mode of an open-loop mode, a closed-loop mode and an external synchronization source mode, and the mode indicated by the mode signaling is used for determining a reference timing of the second node; a mode priority signaling indicated to the second node via wireless air interface signaling, wherein the mode priority signaling is used for indicating the priorities of an open-loop mode, a closed-loop mode and an external synchronization source mode.

According to another embodiment of the present disclosure, a storage medium is also provided. The storage medium stores a computer program, wherein the computer program is determined to execute the steps in any one of the described method embodiments when running.

According to another embodiment of the present disclosure, also provided is an electronic device, comprising a memory and a processor, wherein the memory stores a computer program, and the processor is determined to run the computer program so as to execute the steps in any one of the method embodiments.

By means of the embodiments of the present disclosure, a second node determines a reference timing of the second node by using at least one of the following modes: an open-loop mode, a closed-loop mode and an external synchronization source mode, thereby solving the problem in the related art that there is no technical solution for setting a reference timing between each hops of a link.

BRIEF DESCRIPTION OF THE DRAWINGS

Drawings, provided for further understanding of the present disclosure and forming a part of the present disclosure, are used to explain the present disclosure together with embodiments of the present disclosure rather than to limit the present disclosure. In the drawings.

DETAILED DESCRIPTION OF THE EMBODIMENTS

Figures 1, 2:
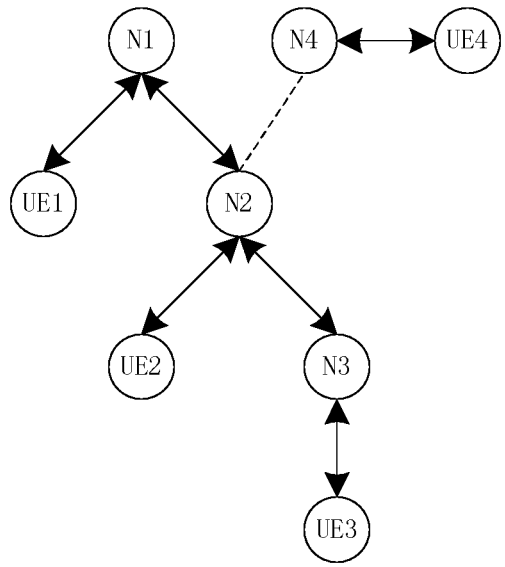
FIG. 1 is a schematic diagram of a node topology according to an embodiment of the present disclosure.
FIG. 2 is a flowchart of a method for determining reference timing according to an embodiment of the present disclosure.

The present disclosure will be described below with reference to the drawings and embodiments in detail. It is important to note that the embodiments of the present disclosure and the characteristics in the embodiments can be combined under the condition of no conflicts.

It should be noted that the terms "first" and "second" in the specification, claims, and accompanying drawings of the present disclosure are used to distinguish similar objects, and are not necessarily used to describe a specific sequence or order.

First, for the nodes involved in this embodiment, as shown in FIGS. 1, N1, N2, N3, and N4 respectively represent a first node, a second node, a third node, and a fourth node; UE1, UE2, UE3 and UE4 respectively represent UEs covered by N1, N2, N3 and N4; N2 may serve as a child node of N1, and N1 may serve as a parent node of N2; in addition, N1 may also serve as a source parent node that is N2, and N4 may also serve as a destination parent node that is N2.

What is achieved by this disclosure is setting the reference timing between each hops of a link. In addition, it should be noted that the timing in the present disclosure refers to a time point when a node performs transmission and reception and corresponds to a boundary of a certain time domain symbol, time slot, subframe, radio frame and superframe; the absolute time refers to time 0, or the absolute time refers to a time index of a time domain symbol, a time slot, a subframe, a radio frame, or a superframe.

Embodiment One

In this embodiment, provided is a method for determining a reference timing. FIG. 2 is a flowchart of a method for determining a reference timing according to an embodiment of the present disclosure. As shown in FIG. 2, the flow comprises the following steps:

Step S202, the second node determines a reference timing of the second node by using at least one of the following modes: an open-loop mode, a closed-loop mode, and an external synchronization source mode.

It should be noted that, the reference timing involved in this embodiment includes at least one of the following: an absolute time, downlink transmission timing, and uplink receiving timing.

In an optional implementation of this embodiment, when the second node determines the reference timing of the second node by adopting the open-loop mode or the closed-loop mode, the method in this embodiment can further include:

Step S11, a second node receives a deterministic signal transmitted by a first node;

Step S12, the second node determines the downlink reception timing of the second node according to the deterministic signal; wherein the deterministic signal includes at least one of a synchronization signal and a reference symbol.

Based on the foregoing step S11 and step S12, in this embodiment, a manner of determining, by the second node, the reference timing of the second node by adopting the open loop mode in step S202 includes:

Steps S202-S11, the second node identifies the node identifier of the first node;

Steps S202-S12: the second node looks up the propagation delay PD corresponding to the node identifier of the first node in the transmission delay table between the second node and each of other nodes, and determines the reference timing of the second node according to the PD and the downlink receiving timing.

In the present embodiment, the method for determining the reference timing of the second node according to the PD and the downlink reception timing involved in the above steps may be implemented in the following manner:

Manner 1: in a case that all the reference timings between the second node and the nodes are aligned and aligned with the reference timing of the donor node, the second node takes the downlink reception timing of the second node as a reference, and drifts the reference forward by a PD time as the reference timing.

Manner 2: in a case that both the reference timing and the uplink transmission timing between the second node and each node are aligned, and aligned with the reference timing of the donor node, the second node takes the downlink reception timing of the second node as a reference, and drifts the reference forward by a PD time as the reference timing.

Manner 3: in a case that the reference timing of the second node is aligned with the uplink transmission timing of the second node, the second node uses the downlink reception timing of the second node as a reference, and shifts a 2*PD time forward from the reference as the reference timing.

Manner 4: in a case that the reference timing of the second node is aligned with the downlink receiving timing of the second node, the second node uses the downlink receiving timing of the second node as a reference, and shifts forward by a 0*PD time as the reference timing.

In addition, the embodiment further comprises a manner for the second node to update a transmission delay table with other nodes, and in a specific implementation manner, a manner for updating the transmission delay table comprises:

Manner 1: a second node receives an update configuration of a transmission delay table by an operation administration and maintenance OAM, and updates the transmission delay table according to the update configuration.

Manner 2: the second node receives the transmission delay table update signaling indicated by the first node through wireless air interface signaling, wherein the wireless air interface signaling comprises at least one of the following: higher layer signaling, MAC layer signaling and physical layer signaling; the second node updates the transmission delay table according to the update signaling.

Manner 3: after the second node identifies the transmission delay between the newly added nodes, the second node updates the transmission delay table.

Manner 4: after the second node identifies that a transmission delay changes due to a specified factor, the second node updates a transmission delay table; the specified factors include at least one of the following: communication environment, clock accuracy drift, and measurement error.

Based on the foregoing step S11 and step S12, in this embodiment, a manner of determining, by the second node, the reference timing of the second node by adopting the closed-loop mode in step S202 includes:

Step S21, the second node determines the reference timing of the second node according to the TA value and the downlink reception timing of the second node.

The mode of determining the reference timing of the second node according to the TA value and the downlink reception timing of the second node may include the following modes in the specific implementation of this embodiment:

Manner (1), in a case that the reference timings between the second node and the nodes are aligned and aligned with the reference timing of the donor node, the second node uses the downlink reception timing of the second node as a reference, and shifts from the reference forward by a time of TA/2 as the reference timing.

Manner (2), in a case that both the reference timing and the uplink transmission timing between the second node and each node are aligned, and aligned with the reference timing of the donor node, the second node uses the downlink reception timing of the second node as a reference, and shifts forward from the reference by TA/2 as the reference timing.

Manner (3), when the reference timing of the second node is aligned with the uplink transmission timing of the second node, the second node takes the downlink reception timing of the second node as a reference, and shifts forward from the reference by a TA time as the reference timing.

Manner (4), when the reference timing of the second node is aligned with the downlink receiving timing of the second node, the second node takes the downlink receiving timing of the second node as a reference, and shifts from the reference by a time offset of 0*TA as the reference timing.

Based on the foregoing step S11 and step S12, in this embodiment, a manner of determining, by the second node, the reference timing of the second node by adopting the closed-loop mode in step S202 includes:

Steps S202-S31, the second node determines the reference timing of the second node according to the TA value, the offset Offset_1 between the uplink receiving timing of the first node and the downlink transmitting timing, and the downlink receiving timing of the second node.

It should be noted that the second node receives an offset Offset_1 which is indicated by the first node through wireless air interface signaling, wherein the wireless air interface signaling comprises at least one of the following: higher layer signaling, MAC layer signaling and physical layer signaling. In addition, in a case that the uplink reception timing of the first node lags behind the downlink transmission timing, Offset_1>=0; in a case that the uplink reception timing of the first node is advanced to the downlink transmission timing, Offset_1<0.

For the manner of determining the reference timing of the second node according to the TA value, the offset Offset_1 between the uplink receiving timing of the first node and the downlink transmitting timing of the first node, and the downlink receiving timing of the second node in the foregoing step S202-31, the specific implementation of this embodiment may include:

Manner (1): when all the reference timings between the second node and the nodes are aligned and aligned with the reference timing of the donor node, the second node takes the downlink reception timing of the second node as a reference, and shifts from the reference forward by a time of (TA+Offset_1)/2 as the reference timing.

Manner (2): when both the reference timing and the uplink transmission timing between the second node and each node are aligned and aligned with the reference timing of the donor node, the second node uses the downlink reception timing of the second nod as a reference, and shifts from the reference forward by a time of (TA+Offset_1)/2 as the reference timing.

Manner (3): when the reference timing of the second node is aligned with the uplink transmission timing of the second node, the second node takes the downlink reception timing of the second node as a reference, and shifts from the reference forward by a TA time as the reference timing.

Manner (4): when the reference timing of the second node is aligned with the downlink receiving timing of the second node, the second node uses the downlink receiving timing of the second node as a reference, and is shifts forward from the reference by a 0*TA time as the reference timing.

Based on the foregoing step S11 and step S12, in this embodiment, a manner of determining, by the second node, the reference timing of the second node by adopting the closed-loop mode in step S202 includes:

Steps S202-41, the second node determines the reference timing of the second node according to the offset Offset_2 between the uplink receiving timing of the first node and the downlink transmitting timing of the first node and the downlink receiving timing of the second node.

In an optional implementation of this embodiment, the second node receives an offset Offset_2 that is indicated by the first node through radio air interface signaling; wherein, the radio air interface signaling comprises at least one of the following: higher layer signaling, MAC layer signaling and physical layer signaling; in a case that the uplink reception timing of the first node lags behind the downlink transmission timing, Offset_2>=0; in a case that the uplink reception timing of the first node is advanced to the downlink transmission timing, Offset_2<0.

The manner for the second node to determine the reference timing of the second node according to the offset Offset_2 between the uplink receiving timing of the first node and the downlink transmitting timing of the first node and the downlink receiving timing of the second node in the described steps S202-41 comprises:

Manner (1): in a case that all the reference timings between the second node and the nodes are aligned and aligned with the reference timing of the donor node, the second node takes the downlink reception timing of the second node as a reference, and then drifts from the reference forward by Offset_2 as the reference timing.

Manner (2): in a case that the uplink transmission timings of the reference timing between the second node and each node are aligned and aligned with the reference timing of the donor node, the second node uses the downlink reception timing of the second node as a reference, and from the reference a time of Offset 2 is shifted as the reference timing.

Manner (3): in a case that the reference timing of the second node is aligned with the uplink transmission timing of the second node, the second node shifts a TA time forward from the downlink reception timing of the second node as the reference timing.

Manner (4): in a case that the reference timing of the second node is aligned with the downlink receiving timing of the second node, the second node uses the downlink receiving timing of the second node as a reference, and shifts from the reference by an offset 0*TA as the reference timing.

The TA value involved in the present embodiment can be acquired in the following manner: a second node receives enabling signaling indicated by a first node through wireless air interface signaling, wherein the wireless air interface signaling comprises at least one of the following: higher layer signaling, MAC layer signaling and physical layer signaling; the second node determines the reference timing of the second node according to the TA value corresponding to the enabling signaling moment, and/or Offset_1, and/or Offset_2, and the downlink receiving timing of the second node.

It should be noted that, when the second node receives the enable signaling of the first node, the second node determines that the second node itself is in the node mode.

In an optional implementation of this embodiment, the method of this embodiment further includes: Step S21, a second node receiving update signaling which is indicated by a first node via wireless air interface signaling, wherein the wireless air interface signaling comprises at least one of the following: high-level signaling, MAC layer signaling and physical layer signaling.

Step S22, the second node updates the reference timing of the second node according to update signaling Delta_1 indicated by the source first node; the second node uses the reference timing of the second node as a reference, and an offset Delta_1 is shifted from the reference as a new reference timing; or, Step S23, the second node updates the reference timing of the second node according to the update signaling Delta_2 indicated by the target first node, and the second node uses the reference timing of the second node as a reference, and shifts from the reference by an offset Delta 2 as a new reference timing.

With regard to the described steps S21 to S23, in a case that the time delay corresponding to the second node update signaling lags behind the reference timing of the second node, Delta_1>=0; when the time corresponding to the second node update signaling is earlier than the reference timing of the second node, Delta_1 less than or equal to 0.

In an optional implementation of this embodiment, the second node updates the reference timing of the second node according to the update signaling Delta_1 indicated by the source first node or the update signaling Delta_2 indicated by the target first node; wherein, (1) In a case that the Delta_2 is greater than the threshold T, the second node uses the reference timing of the second node as a reference, and shifts from the reference by a Delta_1 time as a new reference timing;

(2) in a case that the Delta_2 is less than the threshold T, the second node uses the reference timing of the second node as a reference, and shifts from the reference by a Delta_2 time as a new reference timing;

(3) in a case that the Delta_2 is equal to the threshold T, the second node takes the reference timing of the second node 2 as a reference, shifts from the reference by a Delta_1 time or a Delta_2 time as a new reference timing.

It should be noted that, the external synchronization source mode involved in this embodiment includes at least one of the following: GNSS and IEEE1588 v1/v2.

In an optional implementation of this embodiment, the mode for determining the reference timing is any one of an open-loop mode, a closed-loop mode, and an external synchronization source mode; wherein in a case that the second node has an external synchronization source available, the second node determines a reference timing using an external synchronization source mode; in a case that the second node does not have an available external synchronization source, the closed-loop mode is used to determine the reference timing between the second node and the source first node, and the open-loop mode is used to determine the reference timing between the second node and the target first node.

In another optional implementation of this embodiment, the method of this embodiment further comprises: receiving, by a second node, mode signaling indicating by a first node via wireless air interface signaling, wherein the wireless air interface signaling comprises at least one of the following: higher layer signaling, MAC layer signaling and physical layer signaling; the mode indicated by the mode signaling is at least one of an open-loop mode, a closed-loop mode and an external synchronization source mode; the second node determines a mode for determining a reference timing according to the mode signaling.

In addition, the second node receives mode priority signaling which is indicated by the first node through wireless air interface signaling, wherein the wireless air interface signaling comprises at least one of the following: high-level signaling, MAC layer signaling and physical layer signaling.

The mode priority signaling is used for indicating the priorities of an open-loop mode, a closed-loop mode and an external synchronization source mode, and the second node determines a mode for determining reference timing according to the priorities.

In another optional implementation of this embodiment, the method of this embodiment further includes: sorting the mode priorities from high to low into: an external synchronization source mode, a closed-loop mode, and an open-loop mode.

It should be noted that the above method steps are all described from the second node side, and the present disclosure will be described again from the first node side, wherein the first node and the second node are two corresponding nodes.

On the first node side, in this embodiment, the manners for determining a reference timing of the second node include:

A transmission delay table update signaling indicated by a first node to a second node via radio air interface signaling;

an offset Offset_1 indicated by a first node to a second node through wireless air interface signaling, wherein the Offset_1 represents an offset between uplink receiving timing and downlink transmitting timing of the first node;

an offset Offset_2 indicated by the first node to the second node through wireless air interface signaling, wherein the Offset_2 represents an offset between uplink receiving timing and downlink transmitting timing of the first node;

enabling signaling indicated by a first node to a second node through wireless air interface signaling, wherein the enabling signaling instructs the second node to determine that the second node is in a node mode;

a first node sends update signaling to a second node through wireless air interface signaling, wherein the update signaling instructs the second node to take a reference timing of the second node as a reference offset;

a first node uses wireless air interface signaling to indicate to a second node mode signaling, wherein the mode indicated by the mode signaling is at least one mode of an open-loop mode, a closed-loop mode and an external synchronization source mode, and the mode indicated by the mode signaling is used for determining a reference timing of the second node;

a first node indicates a mode priority signaling to a second node via wireless air interface signaling, wherein the mode priority signaling is used for indicating priorities of an open-loop mode, a closed-loop mode and an external synchronization source mode.

It should be noted that the radio air interface signaling includes at least one of the following: higher layer signaling, MAC layer signaling and physical layer signaling.

The present disclosure is described with reference to the following specific embodiments;

Embodiment Two

Determination of Reference Timing in an Open-Loop Mode

In an optional implementation (1), the node stores a transmission delay table with other nodes. It should be noted that, the transmission delay multiplied by the speed of light is equal to the transmission distance, so the transmission delay table may also be stored with other nodes.

As shown in FIGS. 1, N1, N2, N3, and N4 represent a first node, a second node, a third node, and a fourth node, respectively; UE1, UE2, UE3 and UE4 respectively represent UEs covered by N1, N2, N3 and N4. Where N2 may serve as a child node of N1, and N1 may serve as a parent node of N2; in addition, N1 may also serve as a source parent node that is N2, and N4 may also serve as a destination parent node that is N2.

N2 receives and determines the downlink reception timing of N2 according to the deterministic signal transmitted by N1.

The N2 identifies a node identifier of the N1, the N2 queries a Propagation Delay (PD) corresponding to the node identifier of the N1 in a transmission delay table between the N2 and other nodes, and sets a reference timing of the N2 according to downlink reception timings of the P1 and the N2.

Further, in a case that the reference timings of the nodes are all aligned and aligned with the reference timing of the donor node, that is, the reference timings of N2 and the nodes are all aligned, and the reference timing of N2 is set as: N2 uses the downlink reception timing of N2 as a reference, and shifts forward from the reference by a PD time as a reference timing; or, In a case that the reference timing and the uplink transmission timing of each node are both aligned and the reference timing of the donor node is aligned, that is, the reference timings of N2 and each node are both aligned, the reference timing of N2 being set as: N2 uses the downlink reception timing of N2 as a reference, and shifts from the reference forward by a PD time as a reference timing; or, In a case that the reference timing of N2 is aligned with the uplink transmission timing of N2, the reference timing of N2 is set as: N2 uses the downlink reception timing of N2 as a reference, and shifts from the reference forward by a 2*PD time as a reference timing; or, In a case that the reference timing of N2 is aligned with the downlink reception timing of N2, the reference timing of N2 is set as: N2 uses the downlink reception timing of N2 as a reference, and shifts from the reference by a 0*PD time as the reference timing.

In an optional implementation (2), the node updates a transmission delay table with other nodes; at this time, the transmission delay table between N2 and other nodes needs to be updated due to newly added nodes to the network, or due to reasons such as communication environment, clock accuracy drift, measurement error, and so on.

Specifically, Operation Administration and Maintenance (OAM) updates the transmission delay table, and configures it to N2 and then N2 updates the transmission delay table; or, N1 indicates transmission delay table update signaling, wherein the transmission delay table update signaling is configured to N2 by means of wireless air interface signaling, and the wireless air interface signaling comprises at least one of the following: high-level signaling, MAC layer signaling, physical layer signaling, and N2 updates a transmission delay table; or, After the N2 identifies the transmission delay between the newly added nodes, the N2 updates the transmission delay table; or, After N2 identifies the changed transport delays caused by the communication environment, clock accuracy drift, measurement errors, and other reasons, N2 updates the transport delay table.

Embodiment Three

Setting Reference Timing in a Closed-Loop Mode

Alternative embodiment (1): the child node sets the reference timing of the child node according to the TA value and the downlink receiving timing of the child node;

as shown in FIGS. 1, N1, N2, N3, and N4 represent a first node, a second node, a third node, and a fourth node, respectively; UE1, UE2, UE3 and UE4 respectively represent UEs covered by N1, N2, N3 and N4. N2 may serve as a child node of N1, and N1 may serve as a parent node of N2; in addition, N1 may also serve as a source parent node of N2, and N4 may also serve as a destination parent node of N2.

N2 receives and determines the downlink reception timing of N2 according to the deterministic signal transmitted by N1.

N2 receives the TAC in RAR or TAC in MAC CE of N1, and calculates the TA value with the TAC (the finally calculated TA value may include the transmit/receive translation time TA_offset, wherein TA_offset is greater than or equal to 0) and sets the reference timing of N2 with the downlink reception timing of N2.

Specifically, in a case that the reference timings of the nodes are all aligned and the reference timing of the donor node is aligned, that is, the reference timings of N2 and the nodes are all aligned, the reference timing of N2 is set as: N2 uses the downlink reception timing of N2 as a reference, shifts from the reference forward by TA/2 time a reference timing; or, In a case that both the reference timing and the uplink transmission timing of each node are aligned and the reference timing of the donor node is aligned, i.e. both the reference timings of N2 and each node are aligned, and the reference timing of N2 is set as: N2 uses the downlink reception timing of N2 as a reference, shifts forward from the reference by a time of TA/2 as reference timing; or, In a case that the reference timing of N2 is aligned with the uplink transmission timing of N2, the reference timing of N2 is set such that N2 uses the downlink reception timing of N2 as the reference, shifts forward from the reference by a time of TA as reference timing; or, In a case that the reference timing of N2 is aligned with the downlink reception timing of N2, the reference timing of N2 is set such that N2 uses the downlink reception timing of N2 as the reference, shifts from reference by a time of 0*TA as reference timing.

Alternative implementation (2): the child node sets the reference timing of the child node with the offset between the TA value and the downlink reception timing of the parent node with respect to the downlink transmission timing, and the downlink reception timing of the child node.

N1 indicates an offset signaling Offset_1, in which Offset_1 represents an offset between uplink receiving timing and downlink sending timing of a father node, and the offset signaling Offset_1 is configured to N2 by means of wireless air interface signaling, in which the wireless air interface signaling comprises at least one of the following: high-level signaling, MAC-layer signaling and physical-layer signaling.

N2 receives and determines the downlink reception timing of N2 according to the deterministic signal transmitted by N1.

N2 receives a TAC in RAR or TAC in MAC CE of N1, N2 receives Offset_1 of N1, and calculates a TA value according to said TAC (the finally calculated TA value may comprise a receiving and transmitting transition time TA_offset, wherein TA_offset is greater than or equal to zero), and set a reference timing of N2 according to Offset_1 and the downlink receiving timing of N2. In a case that the uplink receiving timing of a parent node lags behind the downlink sending timing, Offset_1>=0; in a case that the upstream reception timing of the parent node is advanced to the downstream transmission timing, Offset_1<=0.

Specifically, in a case that the reference timings of the nodes are all aligned and the reference timing of the donor node is aligned, that is, the reference timings of the N2 and the nodes are all aligned, the reference timing of the N2 is set as: the N2 uses the downlink reception timing of the N2 as a reference, shifts forward from the reference by (TA+Offset_1)/2 time as reference timing; or, In a case that the reference timing and the uplink transmission timing of each node are both aligned and the reference timing of the donor node is aligned, i.e. the reference timing of N2 is both aligned with the reference timing of each node, and the reference timing of N2 is set as: N2 uses the downlink receiving timing of N2 as a reference, shifts forward from the reference by a time of (TA+Offset_1)/2 as the reference timing; or, In a case that the reference timing of N2 is aligned with the uplink transmission timing of N2, the reference timing of N2 is set such that N2 uses the downlink reception timing of N2 as the reference, shifts forward from the reference by TA time as the reference timing; or, In a case that the reference timing of N2 is aligned with the downlink reception timing of N2, the reference timing of N2 is set such that N2 uses the downlink reception timing of N2 as the reference, shifts from the reference by 0*TA time as the reference timing.

Alternative embodiment (3): the child node sets the reference timing of the child node with an offset between the upstream reception timing of the parent node and the downstream transmission timing of the child node.

N1 indicates an offset signaling Offset_2, and Offset_2 represents an offset between uplink receiving timing and downlink sending timing of a father node, wherein the offset signaling Offset_2 is configured to N2 by means of wireless air interface signaling, and the manner of wireless air interface signaling comprises at least one of the following: high-level signaling, MAC-layer signaling and physical-layer signaling.

N2 receives and determines the downlink reception timing of N2 according to the deterministic signal transmitted by N1.

N2 receives a TAC in RAR or TAC in MAC CE of N1, and calculates a TA value by using the TAC (a finally calculated TA value may comprise a receiving and transmitting transition time TA_offset, wherein TA_offset is greater than or equal to zero); N2 receives Offset_2 of N1, and sets a reference timing of N2 according to Offset_2 and the downlink receiving timing of N2, in a case that the uplink receiving timing of a parent node lags behind the downlink sending timing, Offset_2>=0; in a case that the upstream reception timing of the parent node is advanced to the downstream transmission timing, Offset_2<=0.

Specifically, in a case that the reference timings of the nodes are all aligned and the reference timing of the donor node is aligned, that is, the reference timings of N2 and the nodes are all aligned, the reference timing of N2 is set as: N2 uses the downlink reception timing of N2 as the reference, shifts forward from the reference by Offset_2 time as the reference timing; or, In a case that both the reference timing and the uplink transmission timing of each node are aligned and the reference timing of the donor node is aligned, i.e. both the reference timings of N2 and each node are aligned, and the reference timing of N2 is set as: N2 uses the downlink receiving timing of N2 as a reference, shifts forward from the reference by Offset_2 time as the reference timing; or, In a case that the reference timing of N2 is aligned with the uplink transmission timing of N2, the reference timing of N2 is set such that N2 uses the downlink reception timing of N2 as the reference, shifts forward from the reference by a time of TA as the reference timing; or, In a case that the reference timing of N2 is aligned with the downlink reception timing of N2, the reference timing of N2 is set such that: N2 uses the downlink reception timing of N2 as the reference, shifts from the reference by a time of 0*TA as the reference timing.

In an optional implementation (4), the child node sets the reference timing of the child node according to the indication of a certain moment by the parent node or enabling of a certain moment.

N2 receives the TAC in RAR or TAC in MAC CE of N1, and calculates the TA value with the TAC (the finally calculated TA value may include the receiving and transmitting transition time TA_offset, wherein TA_offset is greater than or equal to zero), and/or N2 receives the Offset_1 of N1, and/or N2 receives the Offset_2 of N1.

N1 indicates enabling signaling, wherein the enabling signaling is configured to N2 by means of wireless air interface signaling, and the manner of the wireless air interface signaling comprises at least one of the following: high-level signaling, MAC layer signaling and physical layer signaling.

When N2 receives the enable signaling of N1, N2 calculates the TA value by using the TAC corresponding to the enable signaling moment, and/or Offset_1, and/or Offset_2, and sets the reference timing of N2 according to the downlink receiving timing of N2; the enable signaling is equivalent to N2 enabling the node mode of N2.

Specifically, N2 applies the TA value, and/or Offset_1, and/or Offset_2 to set the downlink reception timing of N2 as shown in optional implementations (1)-(3).

In an optional implementation (5), the child node updates the reference timing of the node according to the update signaling of the parent node.

Due to the reasons of communication environment, clock accuracy drift, measurement error, and the node switches to the target parent node and so on, then N2 updates the reference timing of N2 according to the update signaling indicated by N1.

Specifically, N1 indicates update signaling, wherein the update signaling is configured to N2 by means of radio air interface signaling; wherein, the radio air interface signaling comprises at least one of the following: higher layer signaling, MAC layer signaling and physical layer signaling.

N2 updates the reference timing of N2 according to update signaling Delta_1 indicated by N1, and N2 uses the reference timing of N2 as a reference, and shifts from the reference by Delta_1 time as a new reference timing; or, N2 updates the reference timing of N2 according to update signaling Delta_2 indicated by N4, and N2 uses the reference timing of N2 as reference, shifts from the reference Delta_2 time as a new reference timing; or, N2 updates the reference timing of N2 according to the update signaling indicated by N1 and N4. If the Delta_2 is greater than the threshold T, N2 takes the reference timing of N2 as a reference, shifts from the reference by Delta_1 time as new reference timing. If the Delta_2 is less than the threshold T, N2 takes the reference timing of N2 as a reference, shifts from the reference by Delta_2 time as new reference timing. If the Delta_2 is equal to the threshold T, N2 takes the reference timing of N2 as a reference, and shifts from the reference by Delta_1 or Delta_2 as new reference timing.

Embodiment Four

Open-Loop Mode+Closed-Loop Mode+Mode Switching or Mode Coexistence Between External Synchronization Source Modes s shown in FIGS. 1, N1, N2, N3, and N4 represent a first node, a second node, a third node, and a fourth node, respectively; UE1, UE2, UE3 and UE4 respectively represent UEs covered by N1, N2, N3 and N4. Where N2 may serve as a child node of N1, and N1 may serve as a parent node of N2; in addition, N1 may serve as a source parent node of N2, and N4 may serve as a target parent node of N2.

Since different networks and different scenes have different requirements for timing precision, an open-loop mode, a closed-loop mode and an external synchronization source mode may simultaneously exist in the system, wherein the external synchronization source mode comprises at least one of the following: GNSS and IEEE 1588 v1/v2.

Specifically, the default mode of the system for setting the reference timing is any one mode of an open-loop mode, a closed-loop mode and an external synchronization source mode, and the preferred default mode of the system is that: N2 has an available external synchronization source, and N2 uses the external synchronization source mode; there is no external synchronization source available for N2, a closed-loop mode is used between N2 and N1, and an open-loop mode is used between N2 and N4; or, N1 indicates mode signaling, wherein the mode signaling is configured to N2 by means of wireless air interface signaling, and the manner of the wireless air interface signaling comprises at least one of the following: high-level signaling, MAC layer signaling and physical layer signaling. The mode signaling indicates at least one mode of an open-loop mode, a closed-loop mode and an external synchronization source mode, and N2 determines a reference timing mode according to the mode signaling; or, N1 indicates mode priority signaling, wherein the mode priority signaling is configured to N2 by means of wireless air interface signaling, and the wireless air interface comprises at least one of the following: high-level signaling, MAC layer signaling and physical layer signaling. The mode priority signaling indicates priorities of an open-loop mode, a closed-loop mode and an external synchronization source mode, and N2 determines a mode for setting a reference timing according to the priorities.

Preferably, the external synchronization source mode is higher than the closed-loop mode and higher than the open-loop mode.

Through the description of the foregoing embodiments, a person skilled in the art may clearly understand that the method according to the foregoing embodiments may be implemented by software in addition to a necessary universal hardware platform, and definitely may also be implemented by hardware. However, in many cases, the former is a preferred implementation. Based on such understanding, the technical solutions of the present disclosure essentially or the part contributing to the prior art may be embodied in the form of a software product, the computer software product is stored in a storage medium (such as a ROM/RAM, a magnetic disk and an optical disk), comprising several instructions for enabling a terminal device (which may be a mobile phone), a computer, a server, a network device, or the like.

Embodiment Five

The embodiment further provides a device for determining a reference timing, which is configured to implement the described embodiment and example implementation mode, and what has been described will not be elaborated. The term "module", as used hereinafter, is a combination of software and/or hardware capable of realizing a predetermined function. Although the apparatus described in the following embodiment is preferably implemented by software, implementation of hardware or a combination of software and hardware is also possible and conceived.

On the second node side, the present embodiment provides a device for determining a reference timing. The device comprises: a first determination module, configured to determine a reference timing of a second node by using at least one of the following modes: an open-loop mode, a closed-loop mode and an external synchronization source mode.

On the first node side, the present embodiment provides a device for determining reference timing, comprising: a second determination module, configured to determine the reference timing of a second node based on wireless air interface signaling by means of at least one of the following:

A transmission delay table update signaling indicated to the second node through the radio air interface signaling; an offset Offset_1 indicated to the second node via wireless air interface signaling, in which the Offset_1 represents an offset between uplink receiving timing and downlink transmitting timing of the first node; an offset Offset_2 indicated to the second node via wireless air interface signaling, in which Offset_2 represents an offset between uplink receiving timing and downlink transmitting timing of the first node; enabling signaling indicated to a second node via wireless air interface signaling, wherein the enabling signaling instructs the second node to determine that the second node is in a node mode; update signaling indicated to a second node via wireless air interface signaling, wherein the update signaling instructs the second node to take a reference timing of the second node as a reference offset; mode signaling indicated to a second node via wireless air interface signaling, wherein the mode indicated by the mode signaling is at least one mode of an open-loop mode, a closed-loop mode and an external synchronization source mode, and the mode indicated by the mode signaling is used for determining a reference timing of the second node; mode priority signaling indicated to a second node via wireless air interface signaling, wherein the mode priority signaling is used for indicating the priorities of an open-loop mode, a closed-loop mode and an external synchronization source mode.

It should be noted that each module may be implemented by software or hardware. The latter may be implemented in the following manner, but is not limited thereto. All the modules are located in a same processor; alternatively, the modules are located in different processors in an arbitrary combination.

The embodiments of the present disclosure further provide a storage medium. The storage medium stores a computer program, wherein the computer program is determined to execute the steps in any one of the method embodiments when running.

Alternatively, in this embodiment, the described storage medium may be determined to store a computer program for executing the following steps:

S1, configured to determine a reference timing of a second node by adopting a mode of at least one of the following: an open-loop mode, a closed-loop mode, and an external synchronization source mode Optionally, in the present embodiment, the storage medium may include, but is not limited to, any medium that can store a computer program, such as a USB flash drive, a Read-Only Memory (ROM for short), a Random Access Memory (RAM for short), a removable hard disk, a magnetic disk, or an optical disc.

An embodiment of the present disclosure also provides an electronic apparatus, comprising a memory and a processor, wherein the memory stores a computer program, and the processor is determined to run the computer program so as to execute the steps in any one of the method embodiments.

Optionally, the electronic apparatus can further comprise a transmission device and an input/output device, wherein the transmission device is connected to the processor, and the input/output device is connected to the processor.

Alternatively, in this embodiment, the processor may be determined to execute the following steps by a computer program:

S1, configured to determine a reference timing of a second node by adopting a mode of at least one of the following: an open-loop mode, a closed-loop mode, and an external synchronization source mode.

Alternatively, for specific examples in this embodiment, reference may be made to the examples described in the foregoing embodiments and optional implementations, and details are not repeatedly described herein in this embodiment.

Obviously, a person skilled in the art should understand that each module or each step of the present disclosure can be implemented by a universal computing device, and they can be concentrated on a single computing device or distributed on a network composed of a plurality of computing devices. Optionally, they may be implemented by program codes executable by a computing device, so that they may be stored in a storage device and executed by the computing device, and in some cases, the illustrated or described steps may be executed in an order different from that here. Alternatively, they are manufactured into integrated circuit modules respectively, or a plurality of modules or steps in them are manufactured into a single integrated circuit module for implementation. Thus, the present disclosure is not limited to any particular combination of hardware and software.

The foregoing descriptions are merely exemplary embodiments of the present disclosure, but are not intended to limit the present disclosure. For those skilled in the art, the present disclosure may have various modifications and variations. Any modifications, equivalent replacements, improvements and the like made within the principle of the present disclosure shall belong to the scope of protection of the present disclosure.

What is claimed is:

1. A method for determining a reference timing, comprising:
  receiving, by a second node, a deterministic signal transmitted by a first node; and determining, by the second node, a downlink reception timing of the second node according to the deterministic signal, wherein the deterministic signal includes at least one of the following: a synchronization signal, and a reference symbol; and
  determining, by the second node, a reference timing of the second node;
  wherein determining, by the second node, a reference timing of the second node comprises: determining, by the second node, a reference timing of the second node according to a Timing Advance (TA) value, a Tdelta, and downlink receiving timing of the second node, wherein Tdelta=(Offset_1)/2, and Offset_1 represents an offset between uplink reception timing and downlink transmission timing of the first node.

2. The method according to claim 1, wherein the reference timing comprises at least one of the following: an absolute time, downlink transmission timing, and uplink reception timing.

3. The method according to claim 1,
  wherein the second node receives the Offset_1 or the Tdelta indicated by the first node through wireless air interface signaling, wherein the wireless air interface signaling comprises at least one of the following: high-layer signaling, MAC layer signaling, and physical layer signaling.

4. The method according to claim 1, further comprising at least one of the following:
  indicating, by the first node, the Offset_1 to the second node through wireless air interface signaling; and
  indicating, by the first node, the Tdelta to the second node by the first node through wireless air interface signaling.

5. The method according to claim 1,
  wherein in a case that the uplink reception timing of the first node lags behind the downlink transmission timing, Tdelta>=0; and in a case that the uplink reception timing of the first node is advanced to the downlink transmission timing, Tdelta<=0.

6. The method according to claim 1,
  wherein the second node determines the reference timing of the second node according to the TA value, the Tdelta and the downlink receiving timing of the second node comprises: taking, by the second node, the downlink reception timing of the second node as a reference, and shifting forward by (TA/2+Tdelta) as the reference timing.

7. A device for determining reference timing, comprising a memory storing instructions and a processor in communication with the memory, wherein the processor is configured to execute the instructions to execute the method of claim 1.

* * * * *